April 26, 1927.  
E. AKERS ET AL  
OIL SAVING DEVICE  
Filed Feb. 2, 1924
1,626,494
6 Sheets-Sheet 1
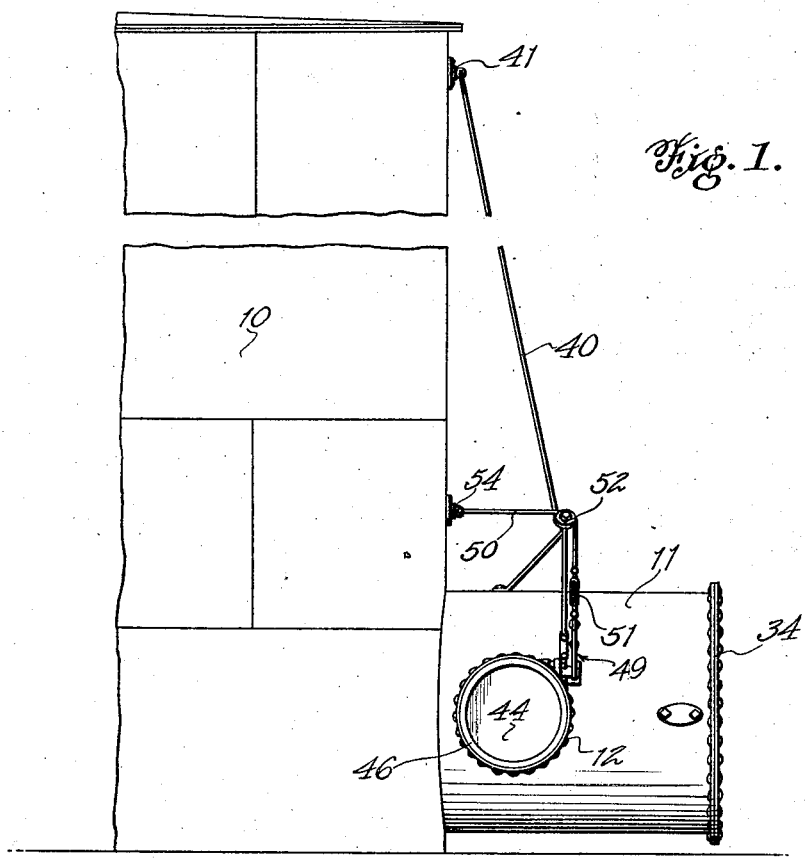
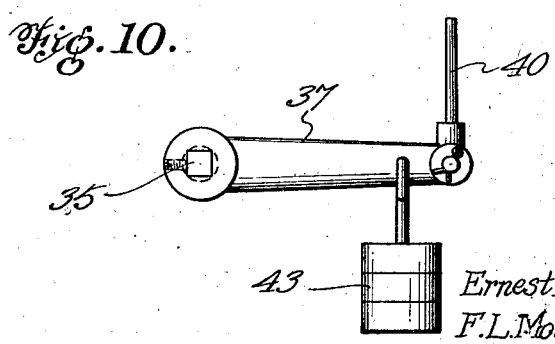
Ernest Akers, Charley C. Mims,
F. L. Moutray, L. P. Miller,
INVENTORS
BY Victor J. Evans
ATTORNEY
WITNESSES:

April 26, 1927.  1,626,494
E. AKERS ET AL
OIL SAVING DEVICE
Filed Feb. 2, 1924   6 Sheets-Sheet 2
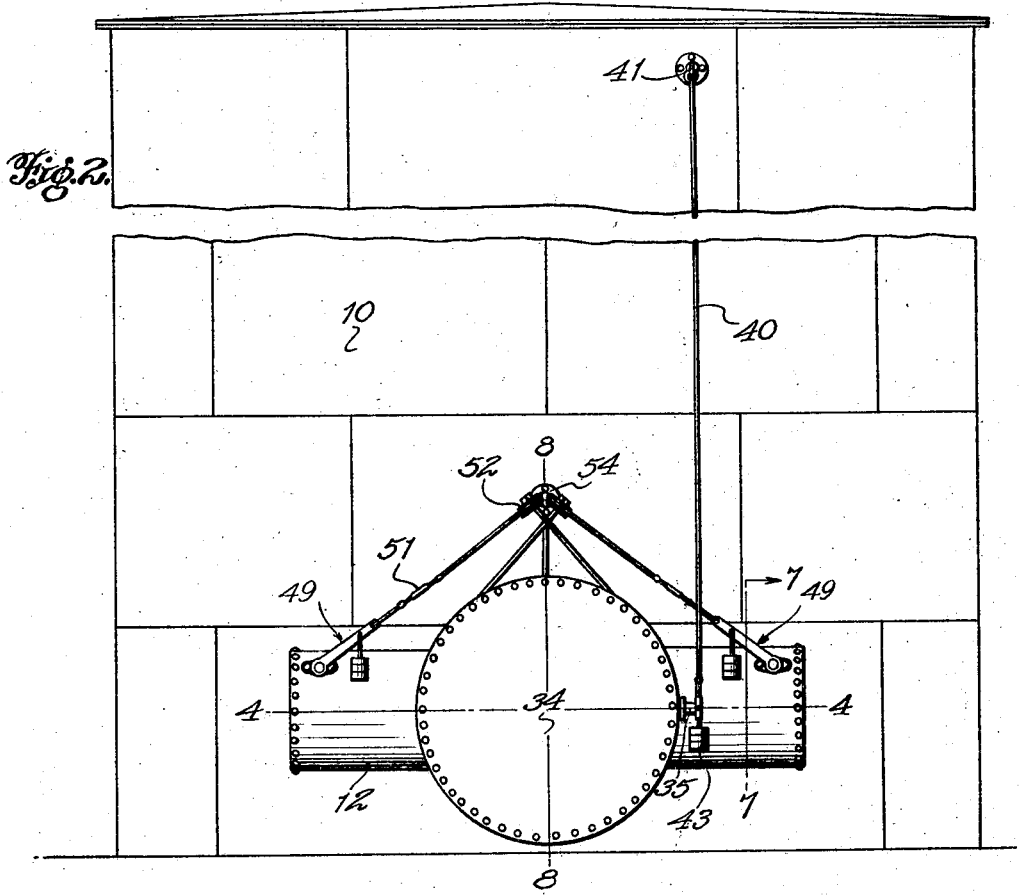
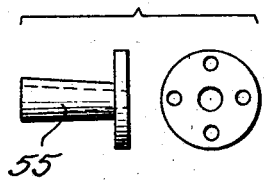
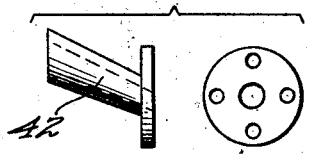
Ernest Akers, Charley C. Mims,
F. L. Moutray, L. P. Miller
INVENTORS April 26, 1927.

E. AKERS ET AL 1,626,494

OIL SAVING DEVICE

Filed Feb. 2, 1924

Ernest Akers, Charley C. Mims,
F. L. Moutray, L. P. Miller
INVENTORS

BY Victor J. Evans
ATTORNEY

WITNESSES:

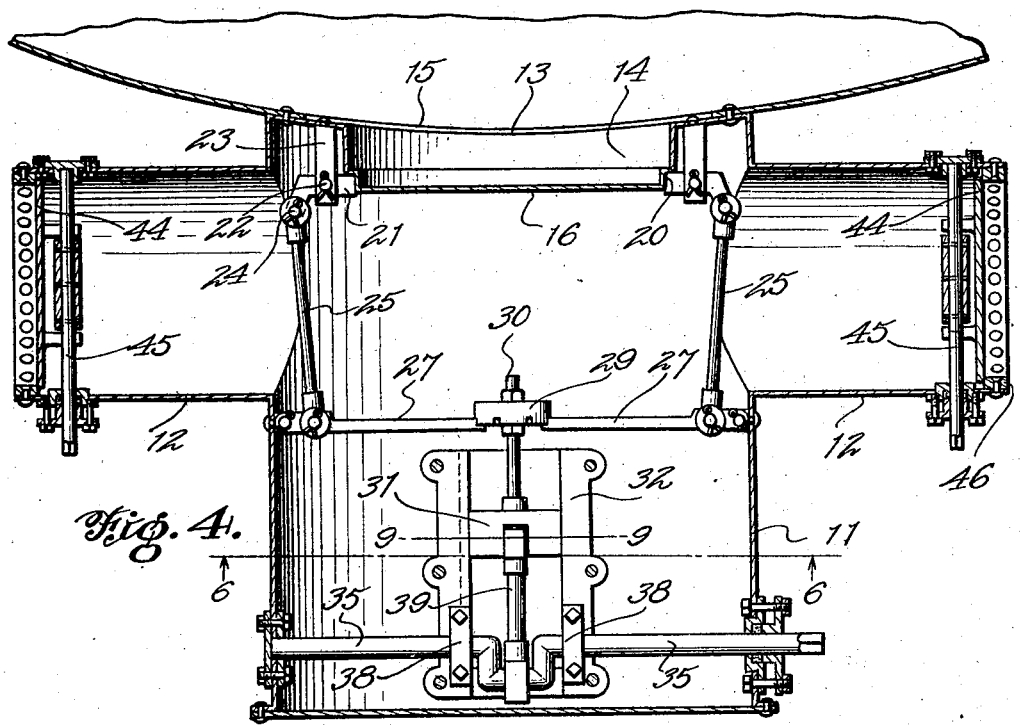
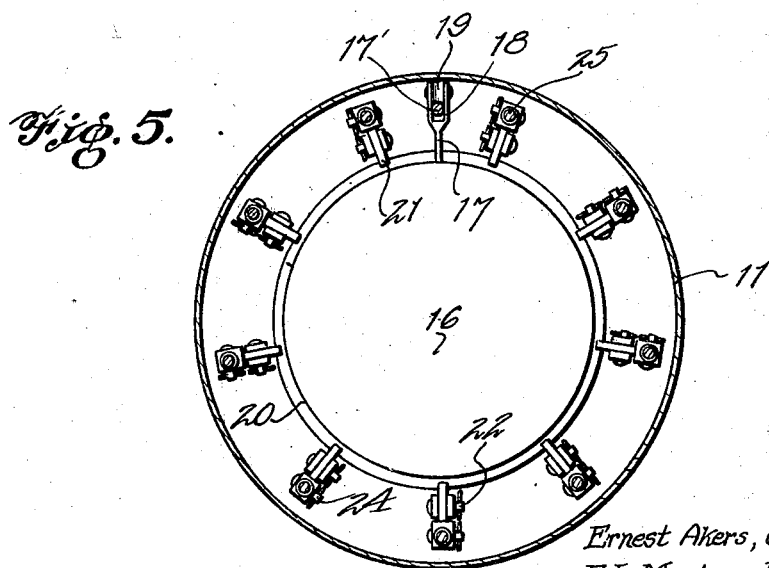

April 26, 1927.
E. AKERS ET AL
1,626,494
OIL SAVING DEVICE
Filed Feb. 2, 1924
6 Sheets-Sheet 5
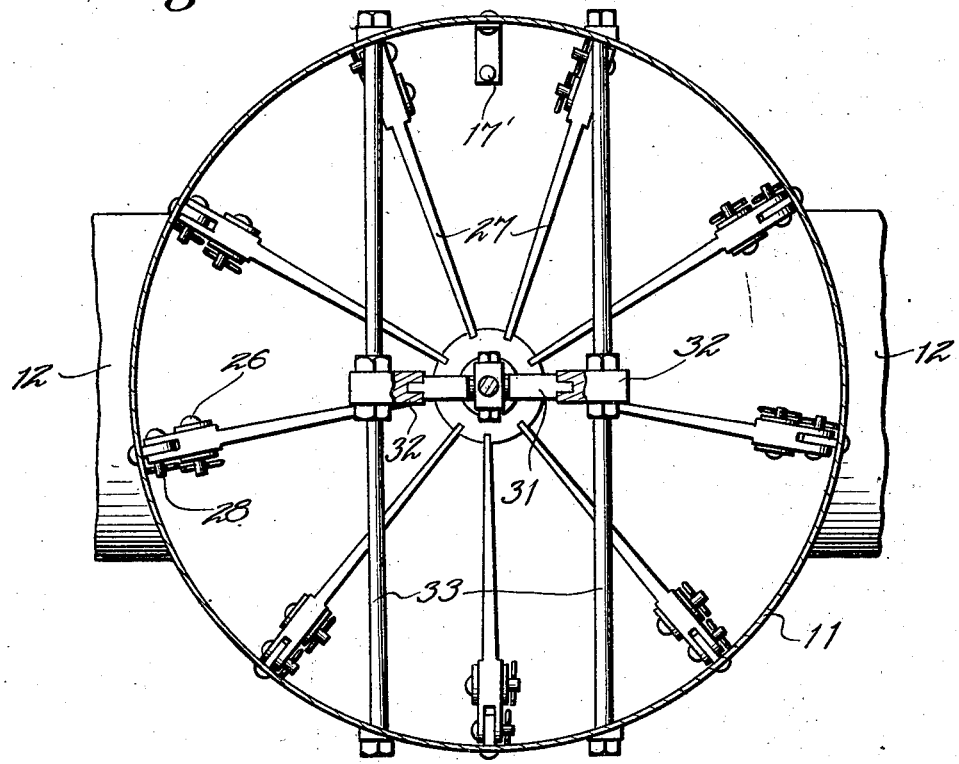
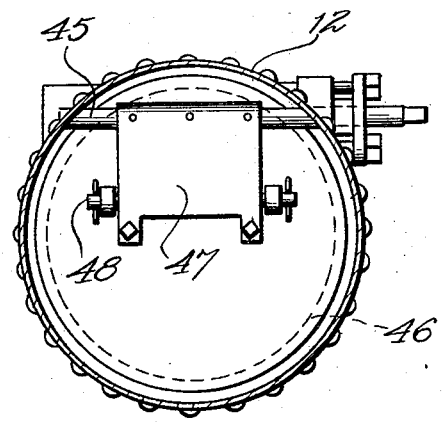
Ernest Akers, Charley C. Mims,
F. L. Moutray, L. P. Miller, INVENTORS
BY Victor J. Evans
ATTORNEY
WITNESSES:

April 26, 1927.   E. AKERS ET AL   1,626,494
OIL SAVING DEVICE
Filed Feb. 2, 1924   6 Sheets-Sheet 6

Ernest Akers, Charley C. Mims,
F. L. Moutray, L. P. Miller
INVENTORS

BY Victor J. Evans
ATTORNEY

WITNESSES:

Patented Apr. 26, 1927.

1,626,494

UNITED STATES PATENT OFFICE.

ERNEST AKERS, CHARLEY C. MIMS, FRED L. MOUTRAY, AND LENARD P. MILLER, OF HUNTSVILLE, TEXAS.

OIL-SAVING DEVICE.

Application filed February 2, 1924. Serial No. 690,285.

This invention relates to improvements in attachments for tanks and has especial relation to attachments adapted to be applied to tanks which are utilized for the storage of oil or other highly inflammable or combustible fluids.

An object of the invention is the provision of means attachable to a tank which is automatically operable in the event of fire to release the contents of the tank and permit said contents to be conveyed to a point remote from the fire.

Another object of the invention is the provision of means for automatically stopping the flow of fluid from the tank in the event that the said fluid is ignited.

With the above and other objects in view, the invention further includes the following novel features and details of construction, to be hereinafter more fully described, illustrated in the accompanying drawings and pointed out in the appended claims.

In the drawings:—

Figure 1 is an elevation of an oil storage tank with the invention applied.

Figure 2 is an elevation at right angles to Figure 1.

Figure 4 is a central horizontal sectional view on the line 4—4 of Figure 2 showing a fragmentary portion of the storage tank, the tank outlet being closed and the casing outlets open.

Figure 5 is a sectional view on line 5—5 of Figure 3, but taken only through the casing portion 11 as illustrated.

Figure 6 is a similar view on the line 6—6 of Figure 4.

Figure 7 is a sectional view on the line 7—7 of Figure 2.

Figure 10 is a detail elevation illustrating the weighted operating arm.

Figure 11 shows side and end views of one of the fuse plug sockets.

Figure 12 shows similar views of the other fuse plug socket.

Figure 3:
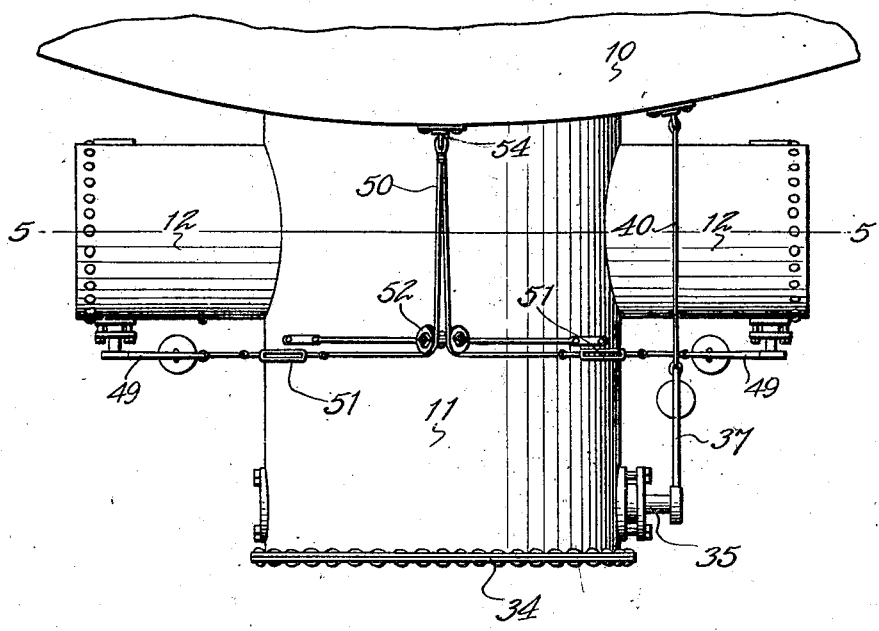
Figure 3 is an enlarged top plan view of the invention per se.
Figure 13:
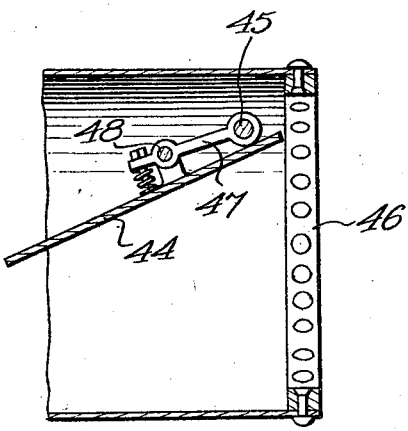
Figures 13 and 14 are fragmentary sectional views illustrating the means for closing the outer ends of the lateral extensions of the casing, the door being shown in both open and closed positions.
Figure 14:
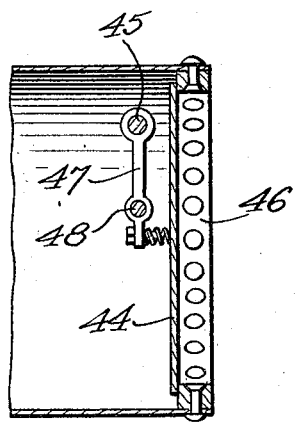
Figure 8:
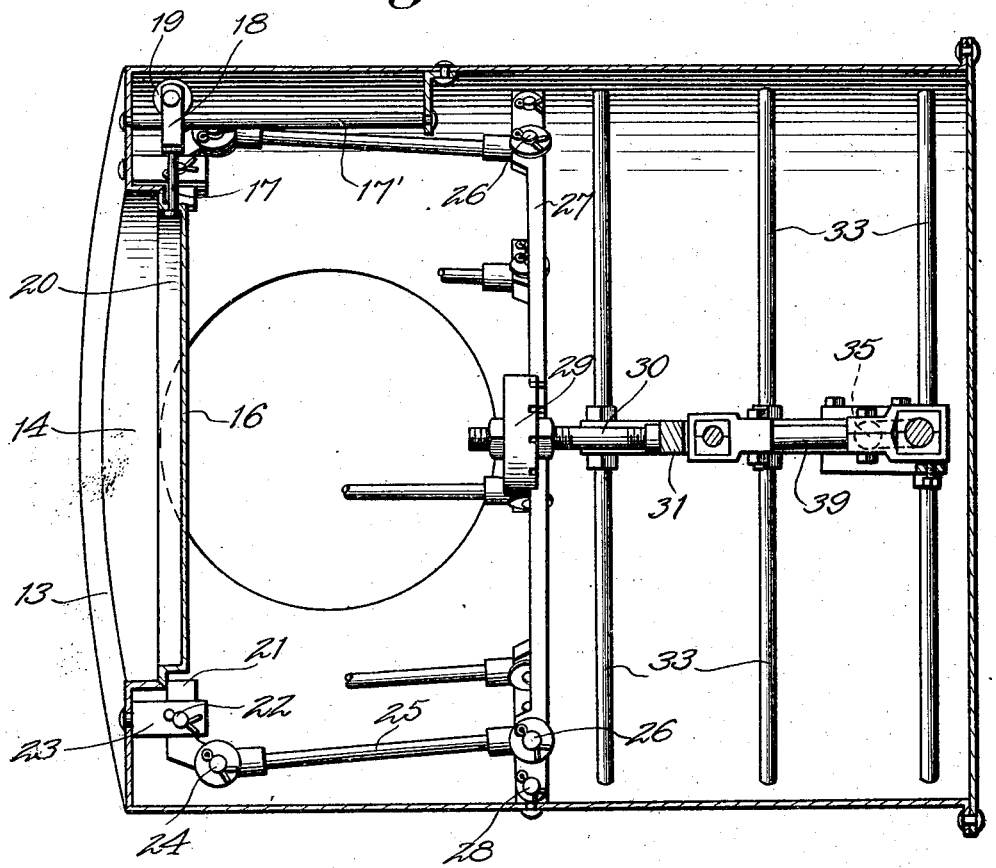
Figure 8 is a section on the line 8—8 of Figure 2.
Figure 9:
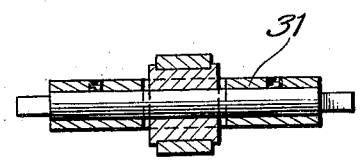
Figure 9 is a section on the line 9—9 of Figure 4.

Referring to the drawings in detail wherein like characters of reference denote corresponding parts, the reference character 10 indicates a tank of the character employed for storing crude oil and while the invention is shown as applied to a tank of this character, it is obvious that it may be applied to other types of tanks utilized as containers for inflammable fluids of any character.

The invention comprises a casing which may be of suitable size and shape, the one shown comprising a main cylindrical body 11 from which extends oppositely located laterally extending portions 12 which are also shown as of cylindrical shape. One end of the main body 11 is curved to conform to the curvature of the surface of the tank as shown at 13 and this portion is provided with an opening 14 which is designed to be positioned over an opening 15 provided in the tank 10 so that communication may be established between the interior of the casing and the interior of the tank. The casing may be secured to the tank by any suitable means such as bolts, rivets and the like.

The opening 14 of the casing is adapted to be closed by a cylindrical closure 16 which is supported by means of a rod 17 extending from the casing, the closure 16 having attached thereto a yoke 18 and pulley 19, the latter riding along the rod 17′ as the closure is moved from a closed to an open position and vice versa.

The closure 16 is provided with an annular shoulder 20 and engaging this shoulder are the inner ends of arms 21. These arms are pivotally mounted as shown at 22 in brackets 23 carried by the casing and have pivotally secured to their outer ends as shown at 24, the inner ends of rods or links 25. The opposite ends of the links or arms 25 are pivotally secured as shown at 26 to levers 27, the latter being pivotally mounted in brackets secured to the casing as shown at 28. The inner or opposite ends of the levers 27 engage within notches provided in a collar 29 which is secured to one end of a rod 30.

The rod 30 is secured to a cross-head 31 which operates in spaced guides 32, the said guides being secured to the casing by means of transversely arranged spaced rods 33.

The outer end of the cylindrical body 11 is closed by a head 34 and extending through the cylindrical body adjacent this head is a crank shaft 35. This shaft is mounted in suitable bearings provided in the cylindrical body 11 and has one of its ends extending through a stuffing box 36, while an arm 37 is secured to this extended end. The crank shaft 35 is further provided with bearings 38 which are secured to the spaced guides 32 and is connected to the cross head 31 by a pitman 39.

The arm 37 has secured to its outer end one end of a rod or cable 40 the opposite end of which is secured within a fusible plug 41 located within a socketed extension 42 which is carried by the tank 10.

Normally fluid is prevented from flowing through the opening 15 of the tank by the closure 16 which closes the opening 14 of the casing. In the event of fire, the plug 41 is fused so as to release the arm 37 and as the latter has attached thereto a weight 43, the said arm will be forced downward so as to rock the crank shaft 35. This movement of the crank shaft will force the notched collar 29 inward so as to release the levers 27, whereupon the weight of the fluid within the tank will force the closure outward, the levers 21 being released by the movement of the levers 27. The fluid may thus flow from the tank through the cylindrical extensions 12, so that the said fluid may escape into a suitable conduit arranged below the casing and designed to conduct the fluid to a safely remote point.

In the event of fluid within the tank being ignited, means are provided for automatically closing the outer ends of the cylindrical extensions 12 so as to prevent the ignited fluid from reaching the fluid which has escaped to the conduit just mentioned. This means consists of doors or closures 44 which are secured to hinge pins 45 and which are adapted to engage collars 46 secured within the discharge end of the extensions 12.

These hinge pins 45 are connected to the doors or closures 44 by means of links 47 and pins 48. The hinge pins 45 extend through the casing and have secured upon one of their ends arms 49. These arms are secured to rods or cables 50 having turn buckles 51 and the said rods or cables pass over pulleys 52 and are secured in a fusible plug 54, the latter being located within a socketed extension 55 secured to the tank 10. In the event of fire, when the oil within the tank reaches a level beneath the plug 54, the latter will be fused and the rods or cables 50 will be released and the doors or closures 44 will drop by gravity to a closed position and held in such closed position by gravity and the force or weight of the contents of the tank.

It will be apparent from the foregoing description and accompanying drawings that the invention provides means which may be attached to a tank to automatically release its contents in the event of fire and to automatically cut off the outflow of such contents in the event that the latter becomes ignited.

The invention is susceptible of various changes in its form, proportions and minor details of construction and the right is herein reserved to make such changes as properly fall within the scope of the appended claims.

Having described the invention what is claimed is:—

1. The combination with a tank having a discharge opening therein, of a casing secured to the tank over said opening, said casing being provided with an opening to establish communication with the interior of the tank, an outlet for the casing, a plurality of radially disposed pivotally mounted arms operatively associated with the closure for holding the latter in closed position, thermostatically controlled axially movable arm engaging means for closing the discharge opening of the tank, a normally open closure for the casing outlet and thermostatically controlled means for regulating the operation of the last mentioned closure.

2. The combination with a tank provided with an opening, of a casing secured to the tank over said opening, said casing being provided with an opening to establish communication with the interior of the tank, a horizontally disposed track, means secured to the closure and engaging the track, whereby the said closure will be supported for horizontal movement, means for holding the closure in closed position, thermostatically controlled means for releasing the closure holding means, an outlet for the casing, a closure for the casing outlet, means for normally holding the last mentioned closure in open position and thermostatically controlled means for releasing the last mentioned holding means.

3. The combination wtih a tank having a discharge opening, of a casing secured to the tank over said opening, said casing being provided with an opening to establish communication with the interior of the tank, a closure for the casing opening, a stationary guide rod, a yoke carried by the closure, a pulley journaled in said yoke and movable on said rod, a weight operated rock shaft, means controlled by the rock shaft and engaging the closure to hold the latter in closed position, thermostatically controlled means for holding the rock shaft against movement, an outlet for the casing, a closure for the casing outlet, means for normally holding the last mentioned closure in open position and thermostatically controlled means for releasing the last mentioned holding means.

4. The combination with a tank having a discharge opening, of a casing secured to the tank over said opening, said casing being provided with an opening to establish communication with the interior of the tank, a closure for the casing opening, a weight operated rock shaft, a plurality of pivotally mounted elements engaging the closure to hold the latter in closed position, means operatively connecting said shaft and elements to control the latter, thermostatically controlled means for holding the rock shaft against movement, an outlet for the casing, a closure for the casing outlet, means for normally holding the last mentioned closure in open position and thermostatically controlled means for releasing the last mentioned holding means.

5. The combination with a tank having a discharge opening, of a casing secured to the tank over said opening, said casing being provided with an opening to establish communication with the interior of the tank, a closure for the casing opening, a weight operated rock shaft, a plurality of pivotally mounted elements engaging the closure to hold the latter in closed position, a collar operatively connected to the rock shaft and movable axially of the closure, means engageable with the collar and operatively connected to the pivotally mounted elements, whereby the closure will be held in closed position, thermostatically controlled means for holding the shaft against movement, an outlet for the casing, a closure for the casing outlet, means for normally holding the last mentioned closure in open position and thermostatically controlled means for releasing the last mentioned holding means.

6. The combination with a tank having a discharge opening, of a substantially T-shaped casing having one end secured to the tank over the opening and providing a radially disposed discharge passage having oppositely disposed passages extending laterally therefrom, a closure at the inlet end of the discharge passage, closures at the outer ends of the laterally extending passages and thermostatically controlled means for holding the closures in normal position.

In testimony whereof we affix our signatures.

ERNEST AKERS.
CHARLEY C. MIMS.
FRED L. MOUTRAY.
LENARD P. MILLER.